Patented Mar. 3, 1936

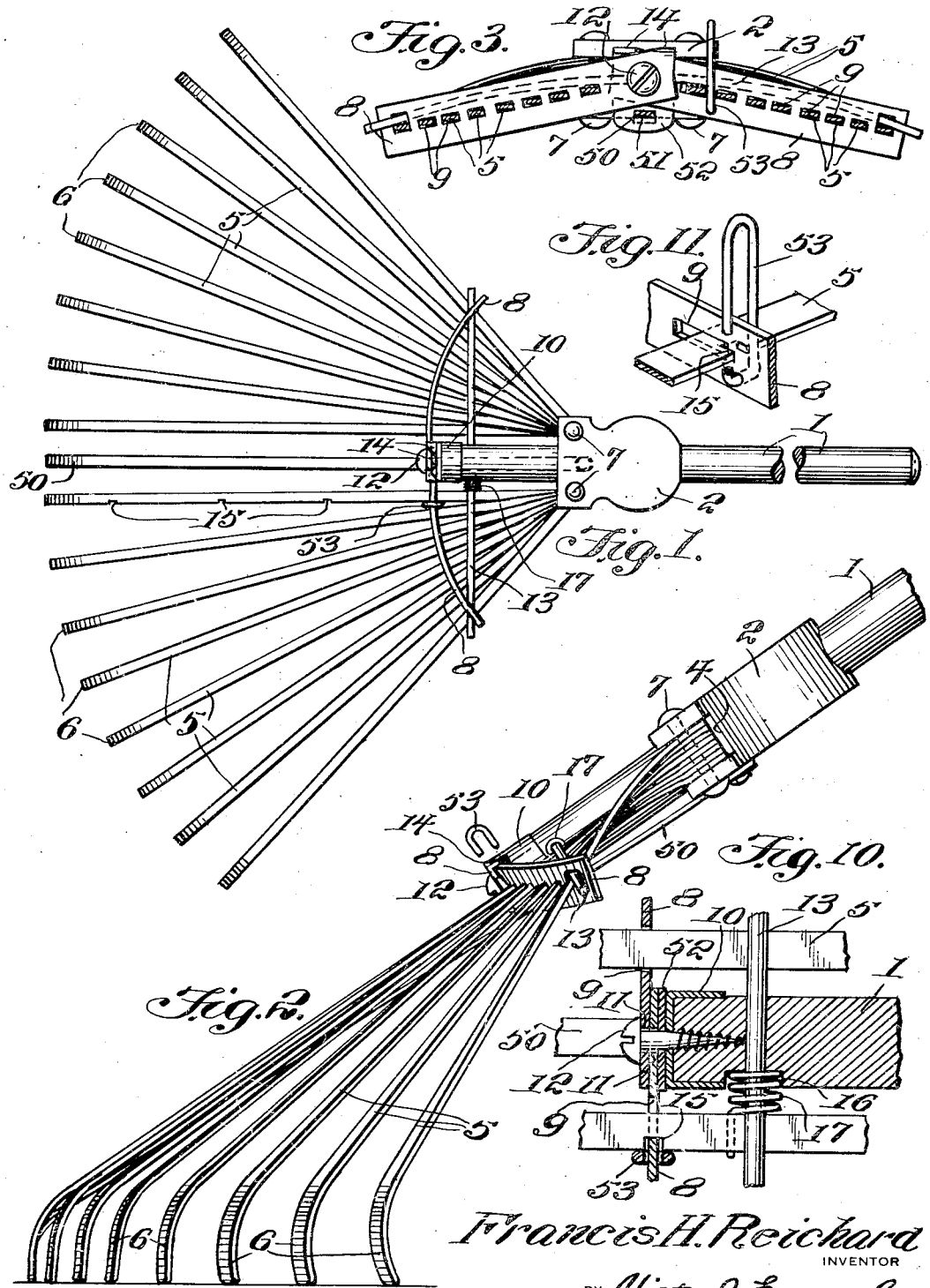

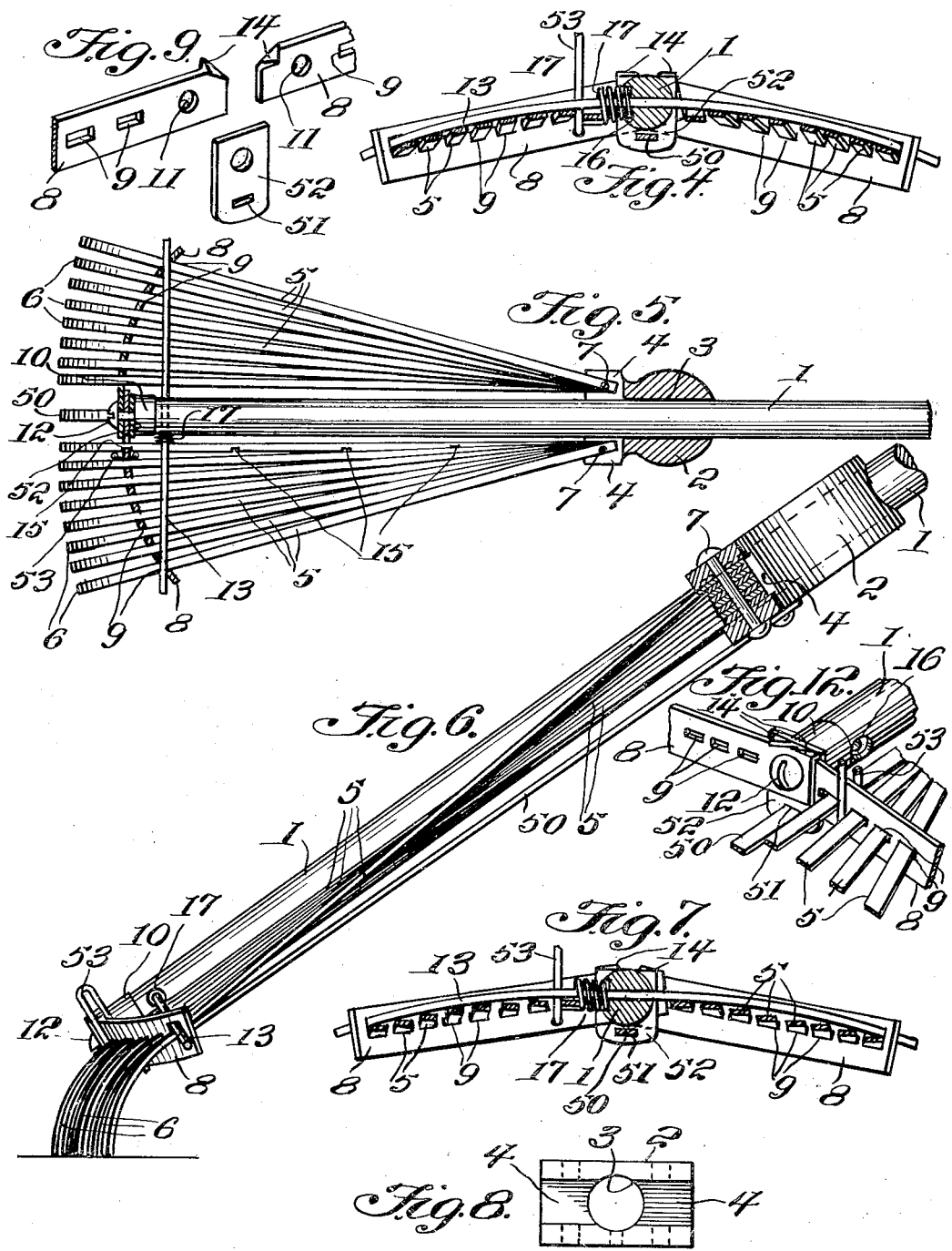

2,032,954

UNITED STATES PATENT OFFICE 2,032,954

LAWN RAKE

Francis H. Reichard, Bangor, Pa.

Application November 26, 1934, Serial No. 754,868

6 Claims. (Cl. 55—10)

This invention relates to lawn rakes and the object is to provide a simple and easily manipulated means whereby the effective width of the rake may be varied and the rake teeth held in the set position. It is also an object to provide adjusting means which will set the rake teeth or tines in such form that the ends of all the teeth or tines will touch the surface to be raked. With these objects in view, the invention consists in certain novel features of construction, combination and arrangement of parts which are illustrated in the accompanying drawings, and hereinafter described and claimed.

In the drawings:

Figure 1 is a plan view of a rake embodying the invention.

Figure 2 is a side view with the rake in working position.

Figure 3 is a transverse section taken in front of the adjusting bars.

Figure 4 is a transverse section taken at the rear of the adjusting bars and brace.

Figure 5 is a plan view, partly in section, showing the rake contracted.

Figure 6 is a side view of the contracted rake in working position.

Figure 7 is a view similar to Figure 4 with the rake in the position shown in Figure 5.

Figure 8 is an end view of the slide.

Figure 9 is a detail perspective view of the inner ends of the adjusting bars or spreaders.

Figure 10 is an enlarged horizontal section through the end of the handle.

Figure 11 is a detail perspective view showing the means for locking the rake in a set position.

Figure 12 is a detail perspective view more particularly showing the support for the central tine.

The handle 1 may be of any approved length and of either wood or metal. A slide 2 is mounted on the handle and consists of a block, preferably of wood given a somewhat ornamental shape, having a central longitudinal opening 3 to accommodate the handle and notches or slots 4 in its forward end. The tines or rake teeth 5 are flexible steel straps or thin bars having their front ends turned downwardly, as at 6, and are arranged in two groups, one at each side of the handle with the rear ends of the tines in each group pivotally secured in one of the notches 4, and a central tine 50 between the two groups. As clearly shown in Figures 2 and 6, the rear ends of the tines in either group are arranged in superposed relation in a notch 4 and a single pivot 7 is inserted through the slide and the ends of all the tines of the group, the ends of the pivot being upset against the slide to hold the tines firmly against release. The rear end of the central tine 50 is passed through a slot 51 in the lower portion of a supporting and guide plate 52 and secured to the under side of the slide 2. This arrangement places the central tine slightly lower than the other tines but the curved end is in line with all the other tines. The adjusting bars or spreaders 8 are light steel bars having series of slots 9 through which the tines 5 pass as shown, and the inner ends of the bars are disposed in overlapping relation in front of the plate 52 and a ferrule 10 on the end of the handle. The overlapped ends of the spreaders are provided with openings 11 which register and through which, and a similar opening in the plate 52, a securing screw 12 is inserted through the ferrule into the end of the handle, as shown clearly in Figure 10. A brace rod 13 is fitted tightly through an opening near the end of the handle and has its ends engaged through openings in the outer ends of the spreaders thereby bracing the spreaders and preventing relative turning of the handle. At their inner ends, the spreaders are provided on their upper corners with oppositely extending lugs or lips 14 which engage over the upper edges of the respective mating spreaders and thereby maintain the spreaders in such angular positions that the tines will be held in proper form to have all their ends touch the surface which is to be raked. It will be readily noted that the screw 12 secures both spreaders and the guide plate 52 to the end of the handle. The described and shown structure permits the use of strip steel and thereby avoids waste, and it must be understood that the spreaders and the plate 52 may be made in one integral structure if preferred.

The innermost slot 9 in one spreader is long enough to permit the tine passing therethrough to have a pivotal movement relative to the ends of the slot, and said tine is provided with a plurality of notches 15 in its outer edge, three notches generally being sufficient. Around the brace rod 13, a recess 16 is formed in the side of the handle and an expansion spring 17 is seated in said recess and bears against the inner edge of the notched tine, being supported by the brace rod, as shown in Figure 10. The spring holds the tine outwardly with a notch 15 engaging the end wall of the slot 9 and holding the spreader against movement along the tine.

Generally, the slide will be in the position shown in Figures 1 and 2 near the end of the handle with the tines having their greatest spread. The wide spread of the rake, however, frequently prevents its successful use in or around shrubbery, and the working width of the rake may then be reduced by pressing upon the notched tine to disengage it from the end wall of the slot 9 and then pulling the slide rearwardly along the handle, thus drawing the tines through the spreaders so that they will be swung more closely together. When the rearward movement brings a notch 15 into the slot 9, the spring 17 at once effects engagement between the notch and the end wall of the slot, as shown most clearly in Figure 10, so that the parts will be held against movement until the tine is again released and the slide further shifted. When the rake is to be shipped or stored, the tines are set in the narrowest compass so that an economy of space is effected.

To facilitate the release of the notched tine, a small lever 53 is pivoted to the spreader in position to bear against the outer edge of the tine. When the rake is to be adjusted to alter its effective width, a slight pressure upon the lever will rock the tine against the force of the spring 17 to release it from the spreader.

Having described my invention, what I claim is:

1. A rake comprising a handle, a slide on the handle, tines pivoted to the slide, a spreader secured to the handle and having slots slidably receiving the tines, there being spaced notches in one of the tines adapted to receive the wall of one of the slots and hold the tines in adjusted spread positions, and spring means carried by the handle for effecting engagement between said notches and said wall.

2. A rake comprising a handle, a slide on the handle, tines pivoted to the slide, a spreader secured to the handle and having sliding engagement with the tines, interlocking means between one of the tines and the spreader, and a helical spring carried by the handle and bearing upon the last named tine for effecting locking engagement between the spreader and the tines.

3. A rake comprising a handle, a slide on the handle, groups of tines pivoted to the slide, a spreader for simultaneously spreading or compacting the tines as the slide is moved along the handle, one of the tines having spaced notches in its edge to engage the spreader and limit spreading movement of the tines, and a helical spring housed in the handle and exerting lateral pressure on the last named tine for locking the tine to the spreader.

4. A rake comprising a handle, a slide on the handle, tines pivoted to the slide, spreaders secured to the handle and slidably supporting the tines, interlocking means between one of the tines and the spreader, a brace rod fitted through the handle and having its ends engaged in the ends of the spreaders, and a helical spring encircling said brace rod and bearing with its opposite ends against the handle and the last named tine for forcing the tine laterally to engage said interlocking means.

5. A rake comprising a handle, a slide on the handle, spreader bars adjustably secured to the end of the handle at an angle to each other and having series of slots therethrough, tines pivoted to the slide and passing slidably through the slots in the spreader bars, one of the tines having notches in its edge to engage an end wall of the corresponding slot in the spreader bar, a spring carried by the handle for yieldably holding the tine in said engagement, and a lever pivoted on the spreader and adapted to release the tine from said engagement.

6. A rake comprising a handle, a slide on the handle, tines pivoted to the slide, a spreader secured to the handle and having slots slidably receiving the tines, a spring carried by the handle for effecting locking engagement between the wall of one of the slots in the spreader and one of the tines, and a pivoted lever on the spreader for releasing the locked tine.

FRANCIS H. REICHARD.